(12) United States Patent
Sun et al.

(10) Patent No.: US 10,404,839 B2
(45) Date of Patent: Sep. 3, 2019

(54) SIGNAL FIELD ENCODING IN A HIGH EFFICIENCY WIRELESS LOCAL AREA NETWORK (WLAN) DATA UNIT

(71) Applicant: Marvell World Trade Ltd., St. Michael (BB)

(72) Inventors: Yakun Sun, San Jose, CA (US); Hongyuan Zhang, Fremont, CA (US)

(73) Assignee: Marvell World Trade Ltd., St. Michael (BB)

( * ) Notice: Subject to any disclaimer, the term of this patent is extended or adjusted under 35 U.S.C. 154(b) by 0 days.

(21) Appl. No.: 15/375,450

(22) Filed: Dec. 12, 2016

(65) Prior Publication Data

US 2017/0171363 A1    Jun. 15, 2017

Related U.S. Application Data

(60) Provisional application No. 62/266,224, filed on Dec. 11, 2015.

(51) Int. Cl.
*H04J 3/24*   (2006.01)
*H04L 29/06*  (2006.01)
(Continued)

(52) U.S. Cl.
CPC ............ *H04L 69/22* (2013.01); *H04L 1/0003* (2013.01); *H04L 1/004* (2013.01); *H04L 1/0059* (2013.01);
(Continued)

(58) Field of Classification Search
CPC ....... H04L 69/22; H04L 65/607; H04L 69/04; H04L 69/324; H04L 12/4633
See application file for complete search history.

(56) References Cited

U.S. PATENT DOCUMENTS 7,599,332 B2    10/2009    Zelst et al.
7,742,390 B2    6/2010    Mujtaba
(Continued)

FOREIGN PATENT DOCUMENTS

EP    2357773 A2    8/2011
WO    WO-2015/105875    7/2015

OTHER PUBLICATIONS

IEEE Std 802.11ac/D7.0 "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

(Continued)

*Primary Examiner* — Un C Cho
*Assistant Examiner* — Atique Ahmed

(57) ABSTRACT

In a method of generating a field of a physical layer (PHY) preamble of a data unit, information bits to be included in the field are generated. Respective sets of tail bits are appended after respective sets of information bits corresponding to respective ones of a plurality of groups of subfields of the field, each group including one or more of the subfields of the field, to generate an encoder input bit stream. One or more padding bits are added to the encoder input bit stream to generate a padded encoder input bit stream, the one or more padding bits to ensure an integer number of puncturing blocks in an encoded output bit stream. The padded encoder input bit stream is encoded to generate the encoded output bit stream. The field is generated to include at least some bits from the encoded output bit stream.

18 Claims, 8 Drawing Sheets

(51) Int. Cl.
| | |
|---|---|
| H04L 1/00 | (2006.01) |
| H04L 5/00 | (2006.01) |
| H04W 72/04 | (2009.01) |
| H04L 27/26 | (2006.01) |
| H04L 29/08 | (2006.01) |
| H04W 84/12 | (2009.01) |

(52) U.S. Cl.
CPC .......... *H04L 1/0069* (2013.01); *H04L 5/0064* (2013.01); *H04W 72/0453* (2013.01); *H04L 27/2601* (2013.01); *H04L 69/323* (2013.01); *H04W 84/12* (2013.01)

(56) References Cited

U.S. PATENT DOCUMENTS

| | | | |
|---|---|---|---|
| 8,155,138 | B2 | 4/2012 | van Nee |
| 8,289,869 | B2 | 10/2012 | Sawai |
| 8,526,351 | B2 | 9/2013 | Fischer et al. |
| 8,619,907 | B2 | 12/2013 | Mujtaba et al. |
| 8,724,720 | B2 | 5/2014 | Srinivasa et al. |
| 9,197,298 | B2 | 11/2015 | Kim et al. |
| 2003/0095532 | A1* | 5/2003 | Kim ................ H04B 1/707 370/342 |
| 2004/0233903 | A1* | 11/2004 | Samaras ............. H04L 1/0065 370/389 |
| 2005/0053097 | A1* | 3/2005 | Djokovic ................ H04B 3/32 370/497 |
| 2009/0196163 | A1 | 8/2009 | Du |
| 2011/0026623 | A1* | 2/2011 | Srinivasa ............. H04L 1/0016 375/260 |
| 2012/0201315 | A1* | 8/2012 | Zhang .................. H04L 1/0046 375/260 |
| 2012/0328034 | A1* | 12/2012 | Nabar .................. H04B 7/0617 375/260 |
| 2013/0044607 | A1* | 2/2013 | Liu .......................... H04W 8/26 370/242 |
| 2013/0121243 | A1* | 5/2013 | Vermani ............... H04L 1/0029 370/328 |
| 2013/0229996 | A1 | 9/2013 | Wang et al. |
| 2013/0259017 | A1* | 10/2013 | Zhang .................. H04W 84/02 370/338 |
| 2013/0266083 | A1* | 10/2013 | Baik ..................... H04L 5/0053 375/260 |
| 2015/0131517 | A1 | 5/2015 | Chu et al. |
| 2016/0150505 | A1* | 5/2016 | Hedayat ................. H04L 69/22 370/329 |
| 2016/0156438 | A1 | 6/2016 | Sun et al. |
| 2016/0261279 | A1* | 9/2016 | Jeong ................ H03M 13/1148 |

OTHER PUBLICATIONS

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).
IEEE P802.11ax™/D0.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 317 pages (Aug. 2016).
IEEE P802.11ax™/D0.5, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN (#1121)," IEEE Computer Society, 376 pages (Sep. 2016).
IEEE Std. 802.11 n™ "IEEE Standard for Information Technology—Telecommunications and information exchange between systems—Local and metropolitan area networks-Specific requirements, Part 11: Wireless LAN Medium Access Control (MAC) and Physical Layer (PHY) Specifications: Amendment 5: Enhancements for Higher Throughput," *The Institute of Electrical and Electronics Engineers, Inc.*, pp. 1-535 (Oct. 2009).
IEEE P802.11 n™ D3.00, "Draft Standard for Information Technology—Telecommunications and information exchange between systems—Local and metropolitan area networks—Specific requirements, Part 11: Wireless LAN Medium Access Control (MAC) and Physical Layer (PHY) specifications: Amendment 4: Enhancements for Higher Throughput," *The Institute of Electrical and Electronics Engineers, Inc.*, pp. 1-544 (Sep. 2007).
IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).
IEEE Std P802.11-REVmc™/D8.0, (Revision of IEEE Std 802.11™-2012), "Draft Standard for Information Technology—Telecommunications and information exchange between systems—Local and metropolitan area networks—Specific requirements," Part 11: Wireless LAN Medium Access Control (MAC) and Physical Layer (PHY) Specifications, The Institute of Electrical and Electronics Engineers, Inc., 3775 pages (Aug. 2016).
IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
Chen, "Home Network Basis: Transmission Environments and Wired/Wireless Protocols," Prentice Hall, pp. 1-26 (Jul. 2006).
Chun et al., "Legacy Support on HEW frame structure," doc: IEEE 11-13/1057r0, *The Institute of Electrical and Electronics Engineers, Inc.*, pp. 1-8 (Sep. 2013).
Hiertz et al., "The IEEE 802.11 Universe," IEEE Communications Magazine, pp. 62-70, (Jan. 2010).
Mujtaba, "IEEE P802.11—Wireless LANs, TGn Sync Proposal Technical Specification," *The Institute of Electrical and Electronics Engineers, Inc.*, doc.: IEEE 802.11—04/0889r6, pp. 1-131 (May 2005).
Perahia et al., "Gigabit Wireless LANs: an overview of IEEE 802.11ac and 80211ad," ACM SIGMOBILE Mobile Computing and Communications Review, vol. 15, No. 3, pp. 23-33 (Jul. 2011).
Seok et al., "HEW PPDU Format for Supporting MIMO-OFDMA," IEEE 802.11-14/1210r0, 16 pages, (Sep. 14, 2014).
Stacey et al., "IEEE P802.11, Wireless LANs, Proposed TGac Draft Amendment," Institute of Electrical and Electronics Engineers, doc. No. IEEE 802.11-10/1361r3 pp. 1-154 (Jan. 2011).
Stacey et al., "Specification Framework for TGac," document No. IEEE 802.11-09/0992r20, *Institute for Electrical and Electronics Engineers*, pp. 1-49, (Jan. 18, 2011).
Tandai et al., "An Efficient Uplink Multiuser MIMO Protocol in IEEE 802.11 WLANs," IEEE 20th International Symposium on Personal, Indoor and Mobile Radio Communications (PIMRC 2009), pp. 1153-1157 (Sep. 13, 2009).
Van Nee et al. "The 802.11 n MIMO-OFDM Standard for Wireless LAN and Beyond," Wireless Personal Communications, vol. 37, pp. 445-453 (Jun. 2006).
International Search Report and Written Opinion in International Patent Application No. PCT/US2016/066096, dated Feb. 21, 2017 (13 pages).
International Preliminary Report on Patentability in International Patent Application No. PCT/US2016/066096, dated Jun. 21, 2018 (9 pages).

(56) References Cited

OTHER PUBLICATIONS

Communication pursuant to Article 94(3) EPC in European Patent Application No. 16822319.6, dated Apr. 9, 2019 (6 pages).

* cited by examiner

SIGNAL FIELD ENCODING IN A HIGH EFFICIENCY WIRELESS LOCAL AREA NETWORK (WLAN) DATA UNIT

CROSS-REFERENCES TO RELATED APPLICATIONS

This disclosure claims the benefit of U.S. Provisional Patent Application No. 62/266,224, filed on Dec. 11, 2015, entitled "Puncturing for HESIGB in 11ax," the disclosure of which is hereby expressly incorporated herein by reference in its entirety.

FIELD OF THE DISCLOSURE

The present disclosure relates generally to communication networks and, more particularly, to wireless local area networks (WLANs) that utilize orthogonal frequency division multiple access (OFDMA) technology.

BACKGROUND

Wireless local area networks (WLANs) have evolved rapidly over the past decade. Development of WLAN standards such as the Institute for Electrical and Electronics Engineers (IEEE) 802.11a, 802.11b, 802.11g, and 802.11n Standards has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method of generating a field of a physical layer (PHY) preamble of a data unit includes generating, at a communication device, information bits to be included in the field. The method also includes appending, at the communication device, respective sets of tail bits after respective sets of information bits corresponding to respective ones of a plurality of groups of subfields of the field, each group including one or more of the subfields of the field, to generate an encoder input bit stream. The method further includes adding, at the communication device, one or more padding bits to the encoder input stream to generate a padded encoder input bit stream, the one or more padding bits to ensure an integer number of puncturing blocks in an encoded output bit stream. The method additionally includes encoding, at the communication device, the padded encoder input bit stream to generate the encoded output bit stream, and generating, at the communication device, the field to include at least some bits from the encoded output bit stream.

In another embodiment, an apparatus comprises a network interface device having one or more integrated circuits configured to generate information bits to be included in the field. The one or more integrated circuits are also configured to append respective sets of tail bits after respective sets of information bits corresponding to respective ones of a plurality of groups of subfields of the field, each group including one or more of the subfields of the field, to generate an encoder input bit stream. The one or more integrated circuits are further configured to add one or more padding bits to the encoder input stream to generate a padded encoder input bit stream, the one or more padding bits to ensure an integer number of puncturing blocks in an encoded output bit stream. The one or more integrated circuits are additionally configured to encode the padded encoder input bit stream to generate the encoded output bit stream, and generate the field to include at least some bits from the encoded output bit stream.

DETAILED DESCRIPTION

In embodiments described below, a wireless network device such as an access point (AP) of a wireless local area network (WLAN) transmits data streams to one or more client stations. The AP is configured to operate with client stations according to at least a first communication protocol. The first communication protocol is sometimes referred herein as "high efficiency WiFi," "HEW" communication protocol, "HE" communication protocol, or IEEE 802.11ax communication protocol. In an embodiment, the first communication protocol supports orthogonal frequency division (OFDM) communication in both downlink direction from the AP to one or more client station and uplink direction from one or more client stations to the AP. In an embodiment, the first communication protocol supports one or more multi-user (MU) modes in which the AP transmits multiple independent data streams simultaneously to multiple client stations, or receives independent data streams simultaneously transmitted by multiple client stations, in some embodiments. Multi-user transmission to, or by, multiple client stations is performed using MU multiple input multiple output (MU-MIMO) transmission in which respective spatial streams are used for transmission to, or by, respective ones of the multiple client stations, and/or using orthogonal frequency division multiple access (OFDMA) transmission in which respective frequency sub-channels of a communication channel are used for simultaneous transmission to, or by, respective ones of multiple client stations, in various embodiments.

In various embodiments, a data unit transmitted in the downlink direction from the AP to one or more client stations ("DL data unit") includes, in a physical layer (PHY) preamble of the data unit, one or more fields that include formatting information needed at the receiving device(s) to properly receive and decode the DL data unit. For example, for a DL MU data unit utilizing OFDMA, the PHY preamble includes one or more fields that include information indicating how frequency resources in a PHY data portion of the data unit have been allocated among multiple receiving devices, according to some embodiments. As another example, for a DL MU data unit utilizing MU-MIMO, the PHY preamble includes one or more fields that include information indicating how multiple spatial streams in a PHY data portion of the data unit have been allocated among multiple receiving devices, according to some embodiments. The multiple receiving devices use such information in the PHY preamble to decode information in the PHY data portion of the DL OFDMA data unit at appropriate frequency portions and/or corresponding to appropriate spatial streams, in various embodiments.

Figure 1:
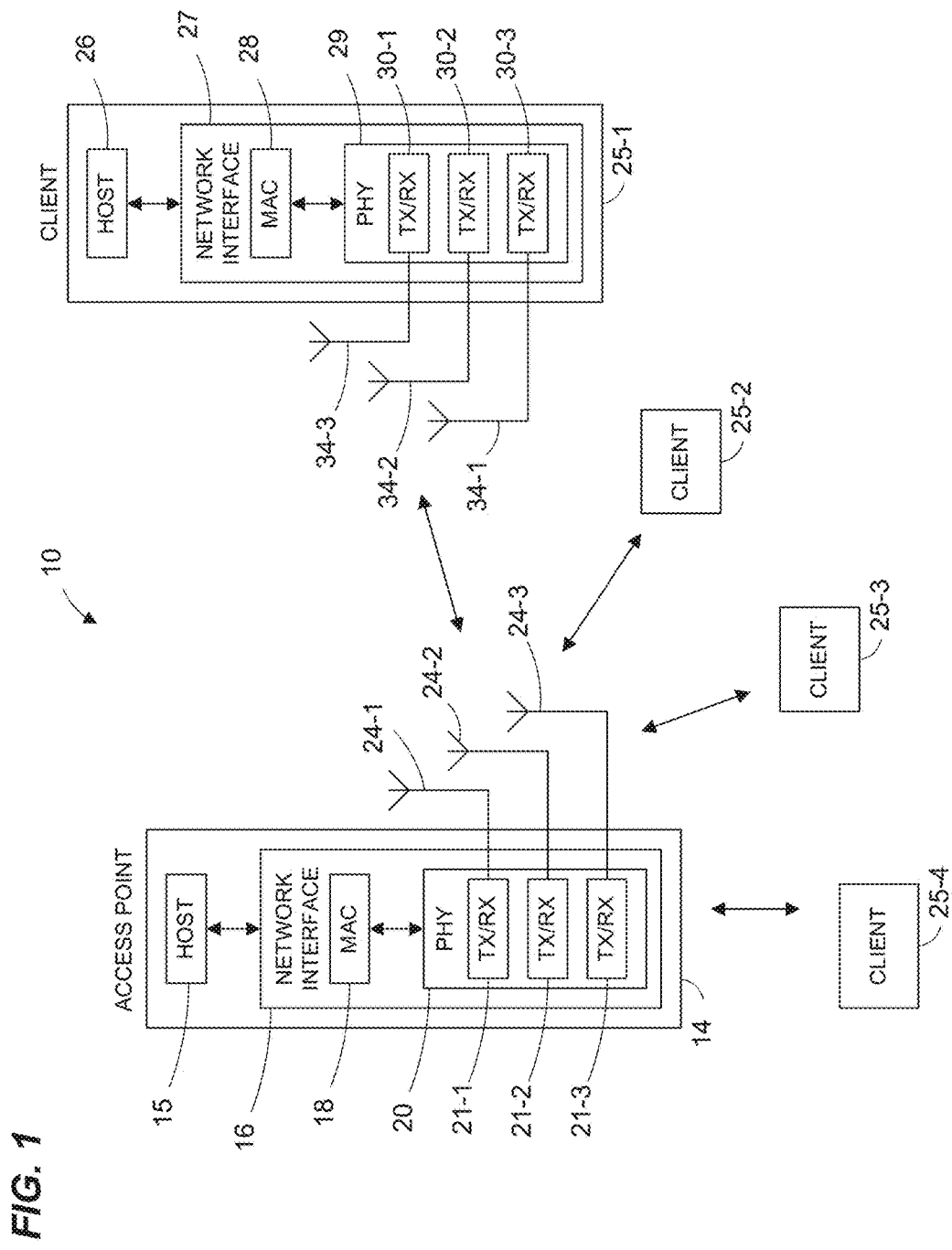
FIG. 1 is a block diagram of an example wireless local area network (WLAN), according to an embodiment.

FIG. 1 is a block diagram of an example WLAN 10 in which techniques described below are utilized, according to an embodiment. The WLAN 10 supports downlink (DL) and/or uplink (UL) OFDMA communication between an AP and a plurality of client stations, in some embodiments. The WLAN 10 also supports DL and/or UL multiuser multiple-input and multiple-output (MU-MIMO) communication between the AP and a plurality of client stations, in some embodiments. Additionally, the WLAN 10 supports DL and UL single-user (SU) communication between the AP and each of a plurality of client stations, in some embodiments.

The WLAN 10 includes an AP 14, and the AP 14, in turn, includes a host processor 15 coupled to a network interface device 16. The network interface device 16 includes a medium access control (MAC) processing unit 18 and a physical layer (PHY) processing unit 20. The PHY processing unit 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In an embodiment, the MAC processing unit 18 and the PHY processing unit 20 are configured to operate according to the first communication protocol (e.g., HE communication protocol). In an embodiment, the network interface device 16 includes one or more integrated circuit (IC) devices. For example, at least some of the functionality of the MAC processing unit 18 and at least some of the functionality of the PHY processing unit 20 are implemented on a single IC device, according to an embodiment. As another example, at least some of the functionality of the MAC processing unit 18 is implemented on a first IC device, and at least some of the functionality of the PHY processing unit 20 is implemented on a second IC device, according to an embodiment.

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 is not configured to operate according to the first communication protocol but is configured to operate according to a legacy communication protocol (referred to herein as a "legacy client station").

The client station 25-1 includes a host processor 26 coupled to a network interface device 27. The network interface device 27 includes a MAC processing unit 28 and a PHY processing unit 29. The PHY processing unit 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In an embodiment, the MAC processing unit 28 and the PHY processing unit 29 are configured to operate according to the first communication protocol (e.g., HE communication protocol). In an embodiment, the network interface device 27 includes one or more IC devices. For example, at least some of the functionality of the MAC processing unit 28 and at least some of the functionality of the PHY processing unit 29 are implemented on a single IC device, according to an embodiment. As another example, at least some of the functionality of the MAC processing unit 28 is implemented on a first IC device, and at least some of the functionality of the PHY processing unit 29 is implemented on a second IC device, according to an embodiment.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. On the other hand, the legacy client station 25-4 is enabled to receive and fully decode and transmit data units according to a second, legacy communication protocol.

In an embodiment, one or both of the client stations 25-2 and 25-3, has a structure the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas, according to an embodiment.

In various embodiments, the PHY processing unit 20 of the AP 14 is configured to generate data units conforming to the first communication protocol and having formats described herein. The transceiver(s) 21 is/are configured to transmit the generated data units via the antenna(s) 24. Similarly, the transceiver(s) 24 is/are configured to receive the data units via the antenna(s) 24. The PHY processing unit 20 of the AP 14 is configured to process received data units conforming to the first communication protocol and having formats described herein and to determine that such data units conform to the first communication protocol, according to various embodiments.

In various embodiments, the PHY processing unit 29 of the client device 25-1 is configured to generate data units conforming to the first communication protocol and having formats described herein. The transceiver(s) 30 is/are configured to transmit the generated data units via the antenna(s) 34. Similarly, the transceiver(s) 30 is/are configured to receive data units via the antenna(s) 34. The PHY processing unit 29 of the client device 25-1 is configured to process received data units conforming to the first communication protocol and having formats described hereinafter and to determine that such data units conform to the first communication protocol, according to various embodiments.

Figure 2:
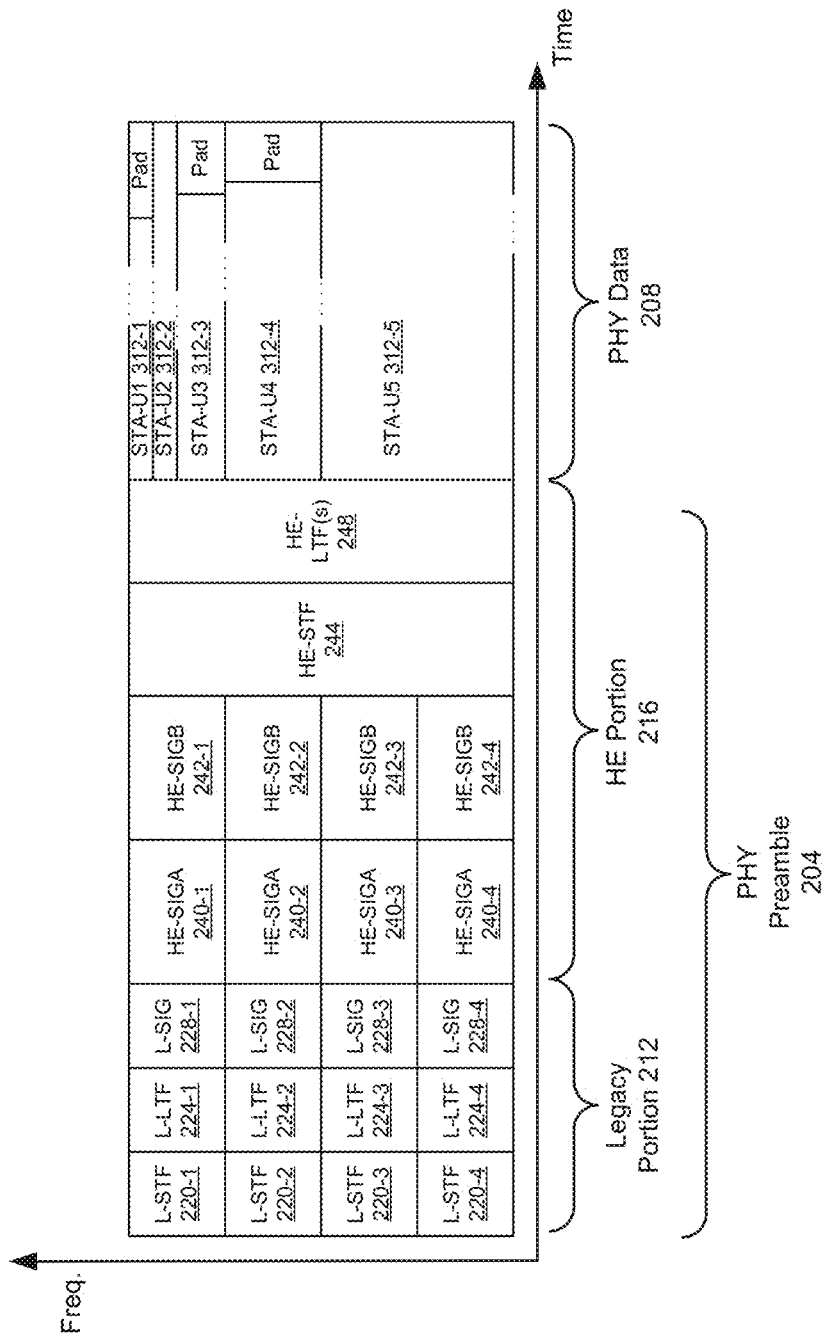
FIG. 2 is a diagram of a physical layer (PHY) data unit, according to an embodiment.

FIG. 2 is a diagram of a physical layer (PHY) data unit 200 that the AP 14 is configured to transmit to one or more client stations 25 (e.g., one or more of the client stations 25-1, 25-2, 25-3), according to an embodiment. In an embodiment, one or more client stations 25 are configured to transmit data unit the same as or similar to the data unit 200 to the AP 14. The data unit 200 conforms to the HE communication protocol and occupies an 80 MHz bandwidth. Data units similar to the data unit 200 occupy other suitable bandwidth such as 20 MHz, 40 MHz, 120 MHz, 160 MHz, 320 MHz, 640 MHz, etc., for example, or other suitable bandwidths, in other embodiments. The data unit 200 is suitable for "mixed mode" situations, i.e. when the WLAN 10 includes a client station (e.g., the legacy client station 24-4) that conforms to a legacy communication protocol, but not the first communication protocol. The data unit 200 is utilized in other situations as well, in some embodiments.

In various embodiments and/or scenarios, the data unit 200 is a downlink (DL) orthogonal frequency division multiple access (OFDMA) unit in which independent data streams are transmitted to multiple client stations 25 using respective sets of OFDM tones and, in some cases respective spatial streams, allocated to the client stations 25. Thus, the AP 14 generates and transmits the data unit 200, in some embodiments.

In an embodiment, available OFDM tones (e.g., OFDM tones that are not used as direct current (DC) tones and/or guard tones) are partitioned into multiple resource units (RUs), and each of the multiple RUs is allocated to one or more client stations 25 for transmission of data to the one or more of the client stations 25. In an embodiment, allocation of OFDM tones is performed using basic resource unit blocks defined by the first communication protocol. A basic resource unit block is sometimes referred to herein as simply a "basic resource unit." For example, a basic resource unit includes M OFDM tones, wherein M is an integer greater than zero, in an embodiment. In an embodiment, each allocated resource unit includes one or more M-OFDM tone basic resource units. As just an example, M=26, in an embodiment. According to this illustrative example, a basic resource unit includes 26 OFDM tones, in this embodiment.

A resource unit allocated to a client station 25, or allocated to multiple client stations 25, includes a number of OFDM tones that is an integer multiple of M (e.g., 26) OFDM tones, such as M*1 (e.g., 26) OFDM tones, M*2 (e.g., 52) OFDM tones, M*3 (e.g., 78) OFDM tones, etc., in an embodiment. In another embodiment, M is any suitable integer other than 26, and a basic resource unit includes a corresponding number of OFDM tones other than 26.

In some embodiments, the first protocol defines individual communication channels of a suitable bandwidth (e.g., 1 MHz, 5 MHz, 10 MHz, 20 MHz, etc.), and composite communication channels can be formed by aggregating or "bonding together" multiple individual channels. Thus, in the example of FIG. 2, the data unit 200 spans a composite communication channel comprising four individual communication channels, according to an embodiment. In other embodiments and/or scenarios, a composite communication channel can consist of different suitable numbers of individual communication channels, such as two, three, four, five, six, seven, etc. In one illustrative embodiment, the first communication protocol permits composite communication channels consisting of two, four, eight, or sixteen individual communication channels.

In an embodiment, each individual communication channel comprises a suitable number of basic resource units. In one illustrative embodiment, each individual communication channel spans a bandwidth of 20 MHz, and each individual communication channel comprises nine basic resource units, where each basic resource unit comprises 26 OFDM tones. In other embodiments, each individual communication channel includes a suitable number of basic resource units different than nine, such as two, three, four, five, etc.

The data unit 200 includes a PHY preamble 204 and a PHY data portion 208. The PHY preamble 204 includes a legacy portion 212 and an HE portion 216.

The legacy portion 212 includes a legacy short training field (L-STF) 220, a legacy long training field (L-LTF) 224, and a legacy signal field (L-SIG) 228. In an embodiment, each L-STF 220, L-LTF 224, and L-SIG 228 spans an individual communication channel and is duplicated in other individual communication channels. For example, in an embodiment, each L-STF 220, L-LTF 224, and L-SIG 228 spans an individual 20 MHz communication channel and is duplicated in other individual 20 MHz communication channels.

The HE portion 216 includes a first HE signal field (HE-SIGA) 240, a second HE signal field (HE-SIGB) 242, an HE short training field (HE-STF) 244, and one or more HE long training fields (HE-LTF(s)) 248. In an embodiment, each HE-SIGA 240 spans an individual communication channel and is duplicated in other individual communication channels. For example, in an embodiment, each HE-SIGA 240 spans an individual 20 MHz communication channel and is duplicated in other individual 20 MHz communication channels. In other embodiments, respective HE-SIGAs 240 in respective individual channels are not duplicates but rather may include different information (e.g., different allocation information), as will be described in more detail below. In an embodiment, respective HE-SIGBs 242 span respective individual communication channels similar to the HE-SIGAs 240. In some embodiments, at least one of the HE-SIGBs 242 includes different information than another HE-SIGB 242. Each of the HE-STF 244 and the HE-LTF(s) 248 span the composite communication channel, in an embodiment. In embodiments in which the data unit 200 spans only a single individual channel, the data unit includes a single L-STF 220, a single L-LTF 224, a single L-SIG 228, single HE-SIGA 240, and a single HE-SIGB 252.

In some embodiments, the preamble 204 includes additional fields not illustrated in FIG. 2.

Each of the L-STF 220, the L-LTF 224, the L-SIG 228, the HE-SIGA 240, the HE-SIGB 242, the HE-STF 244, and the HE-LTF(s) 248 comprises one or more OFDM symbols. As merely an example, in an embodiment, the HE-SIGA 240 comprises two OFDM symbols, and the HE-SIGB 242 comprises one OFDM symbol. As merely another example, in another embodiment, the HE-SIGA 240 comprises one OFDM symbol, and the HE-SIGB 242 comprises two OFDM symbols. As yet another example, in an embodiment, the HE-SIGA 224 comprises two OFDM symbols, and the HE-SIGB 242 comprises a variable number of OFDM symbols. In an embodiment in which the HE-SIGB 242 comprises a variable number of OFDM symbols, the particular number of HE-SIGB 242 OFDM symbols in the data unit 200 is indicated in the HE-SIGA 240.

In some embodiments, the modulation of signals in different individual communication channels signals is rotated by different angles. For example, in one embodiment, all OFDM tones within a first individual communication channel are rotated 0-degrees, all OFDM tones within a second individual communication channel are rotated 90-degrees, a third individual communication channel is rotated 180-degrees, and a fourth individual communication channel is rotated 270-degrees. In other embodiments, different suitable rotations are utilized. The different phases of the individual communication channel signals result in reduced peak to average power ratio (PAPR) of OFDM symbols in the data unit 200, in at least some embodiments.

In an embodiment, each of the HE-SIGA 240 and the HE-SIGB 242 generally carries information about the format of the data unit 200, such as information needed to properly decode at least the data portion 208, in an embodiment. In an embodiment in which the data unit 200 is a multi-user data unit, HE-SIGA 240 carries information commonly needed by multiple intended receivers of the data unit 200. In some embodiments, HE-SIGA 240 additionally includes information for client stations 25 that are not intended receivers of the data unit 200, such as information needed for medium protection from the client stations 25 that are not receivers of the data unit 200.

Figure 3:
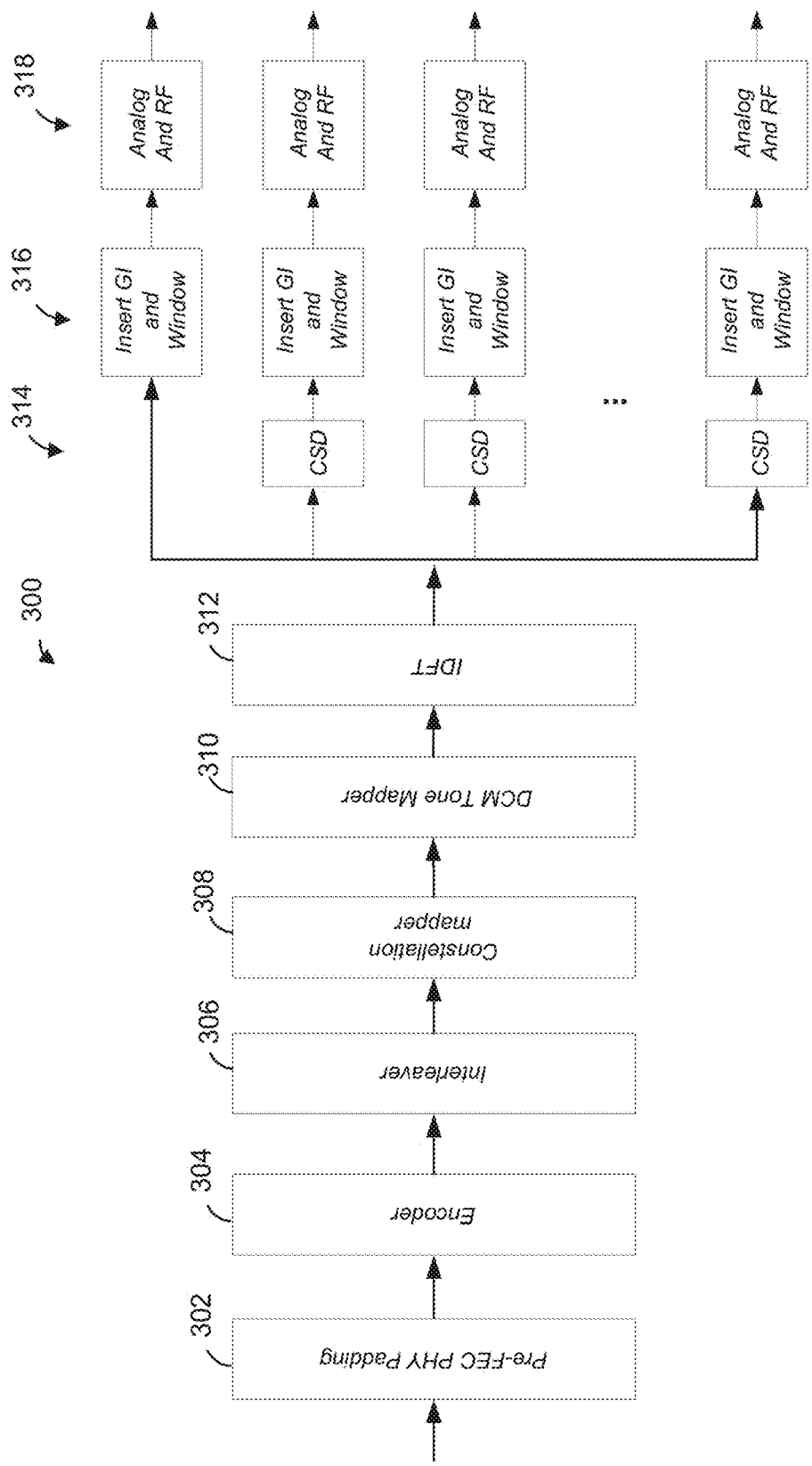
FIG. 3 is a block diagram of a transmit portion of an example PHY processing unit, according to an embodiment.

FIG. 3 is a block diagram of a transmit portion of an example PHY processing unit 300 configured to generate a PHY preamble, according to an embodiment. Referring to FIG. 1, the PHY processing unit 20 of AP 14 and the PHY processing unit 29 of client station 25-1 each include and/or are configured to perform the processing of, the PHY processing unit 300, in one embodiment. In an embodiment, the PHY processing unit 300 is configured to generate a signal field such as the HE-SIGB 242 of FIG. 2. For ease of explanation, the PHY processing unit 300 is described with reference to the HE-SIGB 242 of the data unit 200 of FIG. 2. However, the PHY processing unit 300 generates other suitable PHY preamble fields in other embodiment.

The PHY processing unit 300 generates information bits (e.g., PHY-related bits) to be included in the HE-SIGB 242 (e.g., signal field bits). In some embodiments, the PHY processing unit 300 is configured to add tail bits to the signal field bits. A pre-FCE PHY padding unit 302 adds one or more padding bits to the information bits, for example to ensure an integer number of puncturing blocks in a encoded data stream and/or to ensure that the number of information bits, after encoding, fill an integer number of OFDM symbols. An encoder 304 encodes the information bits and the padding bits. In an embodiment, the encoder 304 is a BCC encoder. In an embodiment, the encoder 304 generates an initial encoded output bit stream corresponding to a base coding rate. In an embodiment, the base coding rate is 1/2. In another embodiment, another suitable coding rate (e.g., 1/3, 1/4, etc.) is used. In an embodiment, the encoder 304 includes or is coupled to a puncturing engine that that punctures the initial encoded output bit stream corresponding to the based coding rate to generate an output encoded bit stream that corresponds to a higher coding rate.

An output of the FEC encoder 304 (or an output of a puncturing engine coupled to the FEC encoder 304) is coupled to an interleaver 306. The interleaver 306 interleaves bits (i.e., changes the order of the bits) to prevent long sequences of adjacent noisy bits from entering a decoder at the receiver. More specifically, the interleaver 306 maps adjacent bits (encoded by the encoder 304) onto non-adjacent locations in the frequency domain or in the time domain. An output of the interleaver 306 (or of the encoder 304 if the interleaver 306 is omitted) is coupled to a constellation mapper 308. In an embodiment, the constellation mapper 308 maps bits to constellation points corresponding to different subcarriers/tones of an OFDM symbol. In an embodiment, the constellation mapper 308 generates modulation data corresponding to frequency domain representations of modulated bits. For example, in an embodiment and scenario, the constellation mapper 308 maps bits to binary phase shift keying (BPSK) constellation points. In other embodiments and/or scenarios, the constellation mapper 308 maps bits to constellation points corresponding to other suitable modulation schemes such phase shift keying (PSK), quadrature amplitude modulation (QAM), e.g., 4-QAM, 16-QAM, 64-QAM, 128-QAM, 256-QAM, etc.

An output of the constellation mapper 308 is coupled to a tone mapper 310. In an embodiment, the tone mapper 310 maps the constellation points to OFDM tones of the HE-SIGB 242. In an embodiment, the tone mapper 310 utilizes direct tone mapping. In this embodiment, the tone mapper 310 maps consecutive constellation points to consecutive "useful" or "data" OFDM tones of the HE-SIGB 242. In other embodiment, the tone mapper 310 "reorders" OFDM tones of the HE-SIGB 242 by mapping consecutive constellation points onto non-consecutive useful OFDM tones of the HE-SIGB 242. In an embodiment, the tone mapper 310 is a dual carrier modulation (DCM) tone mapper that transforms each constellation point into a pair of complex symbols respectively corresponding to constellation point real and imaginary parts, and maps the complex symbols onto different ones of the OFDM tones. In an embodiment, if dual carrier modulation is not being used for the HE-SIGB 242, then the tone mapper 310 is bypassed. In some embodiments, the tone mapper 310 is omitted.

Output of the DCM tone mapper 310 is coupled to an inverse discrete-time Fourier transform (IDFT) calculation unit 312 (e.g., an inverse fast Fourier transform (IFFT) calculation unit). The IDFT calculation 312 converts a block of constellation points to a time-domain signal. Output of the IDFT unit 2012 is provided to each of a plurality of transmit chains corresponding to respective spatial streams. Cyclic shift diversity (CSD) units 314 insert cyclic shifts into all but one of the spatial streams (if more than one spatial stream) to prevent unintentional beamforming. Outputs of the CSD units 314 (or output pf the IDFT calculation unit 312, for the one spatial stream to which CSD is not applied) are provided to GI insertion and windowing units 316 that prepend to OFDM symbols, a guard interval (GI) portion, which is a circular extension of an OFDM symbol in an embodiment, and smooth the edges of OFDM symbols to increase spectral delay. Outputs of the GI insertion and windowing units 316 are provided to Analog and radio frequency (RF) units 318. Each Analog and RF unit 318 converts the corresponding signal to an analog signal and upconverts the signal to RF frequencies for transmission.

Figure 4:
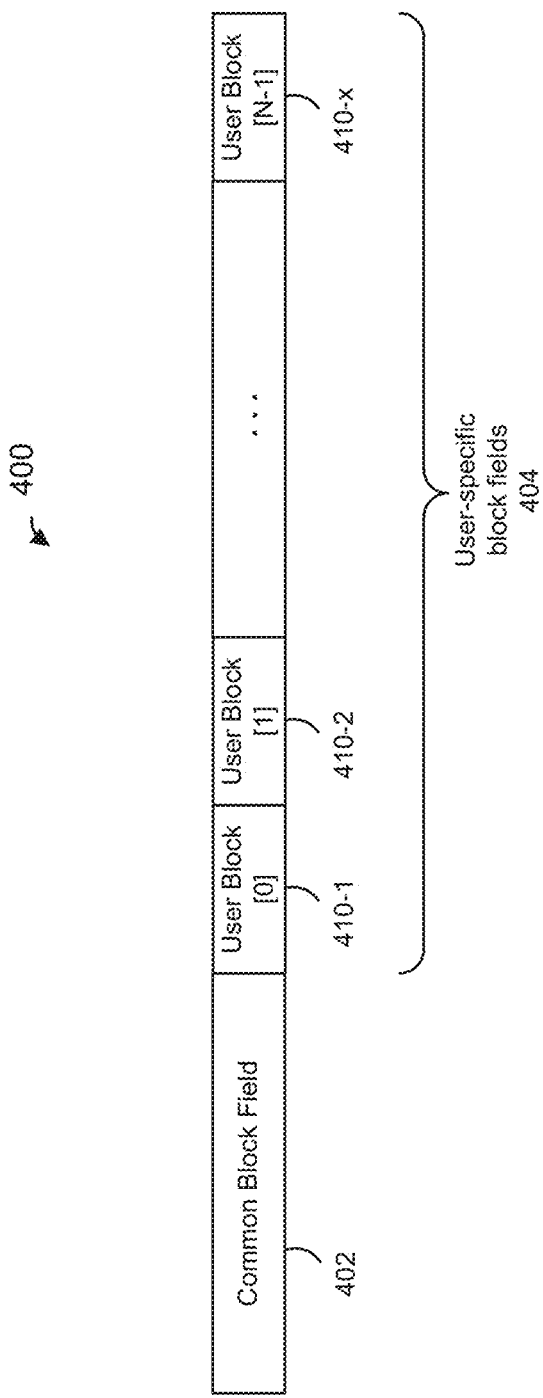
FIG. 4 is a bock diagram of a signal field included in a data unit, according to an embodiment.

FIG. 4 is a bock diagram of a signal field 400, according to an embodiment. The signal field 400 corresponds to the HE-SIGB field 242 of FIG. 2, in an embodiment. For ease of explanation, the signal field 400 is described with reference to the HE-SIGB 242 of the data unit 200 of FIG. 2. However, the signal field 200 corresponds to another signal field of the data unit 200 (e.g., the HE-SIGA 240), or is included in a data unit different from the data unit 200 of FIG. 2, in some embodiments. The signal field 400 includes a common block field (also sometimes referred to herein as "common block subfield") 402 and a user-specific portion 404 that includes one or more user-specific block fields (also sometimes referred to herein as "user-specific block subfield") 410. The common block field 402 generally includes common information intended for all intended receivers of the data unit 200, in an embodiment. For example, in an embodiment, the common block field 402 includes resource allocation information regarding the data portion 208 of the data unit 200. In an embodiment, each of the one or more user-specific block fields 410 includes user specific information for a particular intended receiver of the data unit 200. In an embodiment, each particular one of the one or more user-specific block fields 410 indicates transmission parameters used for transmission of data to a particular one of the client stations 25 that are intended receivers of the data unit 200. In an embodiment, a particular user-specific block field 410 includes an identifier of a particular client station 25 that is an intended receiver of data in the data unit 200, and further includes indications of one or more of (i) modulation and coding scheme (MCS) used for transmission of data to the particular client station 25, (ii) number of space time streams (Nsts) used for transmission of the data to the particular client station 25, (iii) whether transmit beamforming is used for transmission of the data to the particular client station 25, (iv) whether dual carrier modulation (DCM) is used for is used for transmission of the data to the particular client station 25, (v) a type of coding (e.g., BCC or LDPC) used to encode the data for the particular client station 25, etc.

In some embodiments, the common block field 402 includes a number of information bits that depends on a mode of the data unit 200, such as a bandwidth occupied by the data unit 200. For example, the common block field 402 includes a first number of information bits when the data unit 200 occupies a 20 MHz bandwidth and a second number of information bits when the data unit 200 occupies a 40 MHz bandwidth, wherein the second number of information bits is greater than the first number of information bits, in an embodiment. Additionally or alternatively, in some embodiment, respective ones of the user-specific block fields 410 include different numbers of information bits. In some embodiments, a number of information bits included in a user-specific block field 410 depends on a mode of the data unit 200, such as a bandwidth occupied by the data unit 200. As just an example, a user-specific block field 410 includes a first number of information bits when the data unit 200 occupies a 20 MHz bandwidth and a second number of information bits when the data unit 200 occupies a 40 MHz bandwidth, wherein the second number of information bits is greater than the first number of information bits, in an embodiment. In some embodiments, particular ones of the user-specific block fields 410 include different numbers of information bits depending on channel configurations used with the resource units to which the particular user-specific block fields 410 correspond. For example, a user-specific block field 410 includes a first number of bits if the user-specific block field 410 corresponds to a resource unit allocated for transmission of data to a single client station 25 and a second number of information bits if the user-specific block field 410 corresponds to a resource unit allocated for transmission of data to a client station 25 in a group of multiple client stations 25, wherein the second number of information bits is greater than the first number of information bits, in an embodiment. In some embodiments, the user-specific block fields 410 include an equal number of information bits regardless of the mode of the data unit 200 and/or regardless of configurations of particular resource units to which the user-specific block fields 410 correspond.

Figure 5:
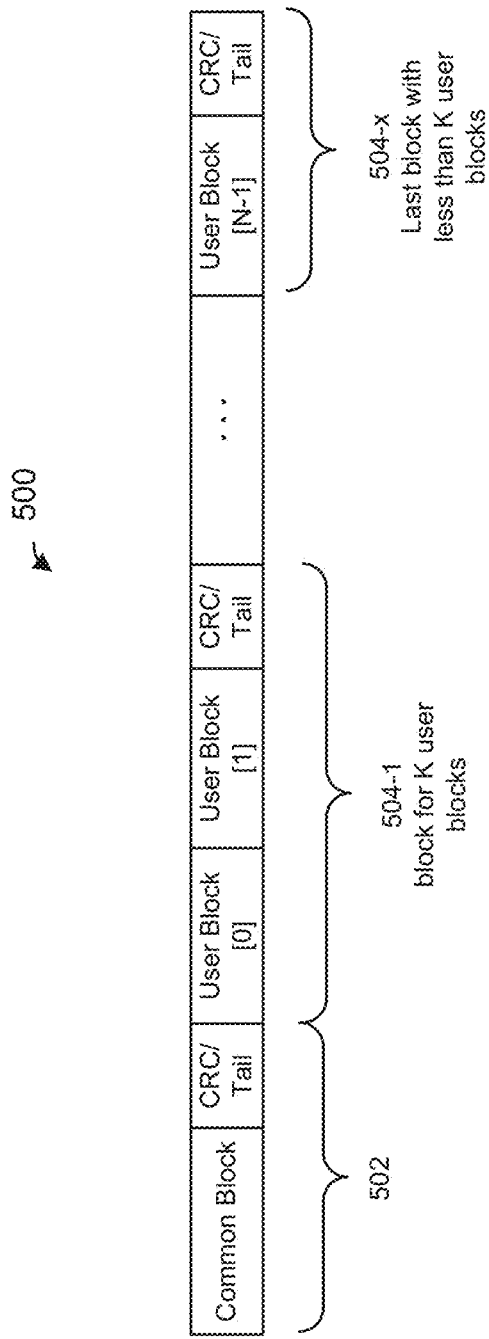
FIG. 5 is a diagram of an encoding scheme used for encoding a signal field, according to an embodiment.

FIG. 5 is a diagram of an encoding scheme used for encoding the common block field 402 and the user-specific portion 404 of the HE-SIGB field 242, according to an embodiment. The common block field 402 and the user-specific portion 404 of the HE-SIGB field 242 are encoded using BCC encoding, in this embodiment. The common block field 402 is individually encoded as a first BCC block 502, in an embodiment. As illustrated in FIG. 5, the encoded BCC block 502 includes cyclic redundancy check bits and tail bits, in an embodiment. The CRC bits are used to check correctness of the common block information bits at a receiver, and the tail bits are used to initialize a decoder at the receiver, in an embodiment.

With continued reference to FIG. 5, the user-specific block fields 410 are encoded in groups, each group having up to K user-specific block fields 410, wherein K is a positive integer greater than 0, in an embodiment. Each group of up to K user-specific block fields 410 is encoded as a separate BCC block 504, in this embodiment. In an embodiment, if the number N of user-specific block fields 410 in the HE-SIGB field 242 is not divisible by K, then the last L user-specific block fields 410 are encoded as a last BCC block 504, wherein L is a positive integer and wherein L<K. In the embodiment of FIG. 5, K is equal to 2 and L is equal to 1. Each group of two user-specific block fields 410, except for the last one user-specific block 410, is encoded as a respective BCC block 504. The last user-specific block field 410 is individually encoded as a separate BCC block 504, in the illustrated embodiment. In other embodiments and/or scenarios, K is a suitable integer other than 2 (e.g., 3, 4, 5, 6, etc.), and, depending on the number of user-specific blocks 410 in the signal field, L is an integer other than 1 (e.g., 0, 2, 3, 4, 5, 6 etc.).

In an embodiment, K is a predetermined integer. In another embodiment, K is configurable. For example, the AP selects or determines any suitable number K of user-specific blocks to be encoded as separate BCC blocks 504, and signals the determined or selected number K, explicitly or implicitly, to client stations 25, in an embodiment.

In some embodiments, the user-specific block fields 410 are encoded in groups that do not necessarily include equal numbers of user-specific block fields 410. As an example, if a plurality of user-specific block field 410 correspond to client stations included in an MU-MIMO transmission over a bandwidth that is greater than 20 MHz (e.g., using a 484-OFDM tone resource unit), these user-specific block fields 410 from a group that is encoded as a single block, in an embodiment. As another example, in an embodiment, a first number of user-specific block fields 410 corresponding to particular one or more 20 MHz channels from a first group of user-specific fields encoded as a first single block, and a second number of user-specific blocks 410 corresponding to one or more other 20 MHz channels from a second group of user-specific fields encoded as a second single block, wherein the first number of user-specific block fields 410 is not necessarily the same as the second number of user-specific block fields 410.

In an embodiment, generating the HE-SIGB field 242 includes appending respective sets of CRC and tail bits to information bits corresponding to (i) the BCC block 502 and (ii) each of the BCC blocks 504 to generate an encoder input bit stream. In an embodiment, the encoder input bit stream is provided to one or more parallel encoders that continually encode the encoder input bit stream. For example, referring to FIG. 3, the encoder input bit stream is provided to the encoder 304 that continually encodes the encoder input bit stream. Continually encoding the encoder input bit stream that includes tail bits appended to information bits corresponding to the BCC block 502 and to information bits corresponding to each of the BCC blocks 504 effectively results in independently encoded BCC blocks 502 and 504, in an embodiment.

In an embodiment, the HE-SIGB field 242 selectively utilizes one of a plurality of modulation and coding schemes (MCSs). For example, in an embodiment, the HE-SIGA field 240 includes an indication of an MCS utilized for the HE-SIGB field 242, and the HE-SIGB field 242 is encoded and modulated according to the MCS indicated in the HE-SIGA field 240. At least some of the plurality of MCSs define respective different coding rates. For example, at least a first MCS that may be used for HE-SIGB field 242 defines BCC encoding with a coding rate of 1/2, at least a second MCS that may be used for HE-SIGB field 242 defines BCC encoding with a coding rate of 2/3, and at least a third MCS that may be used for HE-SIGB field 242 defines BCC encoding with a coding rate of 3/4, in an embodiment. In other embodiments, BCC encoding with other suitable coding rates (e.g., 1/4, 3/8, 5/6, etc.), in addition to or instead of one or more of the coding rates of 1/2, 2/3, and 3/4, may selectively be used for the HE-SIGB field 242.

In an embodiment, the HE-SIGB field 242 is encoded using a BCC encoder (e.g., the BCC encoder 304) with a base coding rate of 1/2, and puncturing is used to generate higher coding rates such as coding rates of 2/3 and 3/4 if the MCS being used defines the higher coding rate. For example, in an embodiment, the BCC encoder 304 of FIG. 3 includes or is followed by a puncturing engine. The BCC encoder 304 encodes information bits of the HE-SIGB field 242 with a coding rate of 1/2, in an embodiment. If the MCS being utilized for the HE-SIGB field 242 defines a coding rate greater than 1/2, then the puncturing engine operates on information bits encoded by the BCC encoder 304 to generate a punctured bit stream corresponding to the higher coding rate. In an embodiment, puncturing involves splitting coded bits into puncturing blocks and omitting certain bits in each of the puncturing blocks. The punctured coded bits are then transmitted without the omitted coding bits, in an embodiment.

In some embodiments, depending, for example, on factors such as (i) a particular number of information bits in the common block field 402 of the HE-SIGB 242, (ii) particular numbers of information bits in the user-specific block fields 410 of the HE-SIGB 242, (iii) the number of user-specific block fields 410 in the HE-SIGB 242, encoding the information bits to be included in the HE-SIGB 242 may result in a non-integer number of puncturing blocks, in at least some situations. In various embodiments, one or more padding bits are added to information bits to be included in the HE-SIGB field 242 to ensure that the puncturing engine operates on an integer number of puncturing blocks. In an embodiment, the one or more padding bits are added (e.g., appended), to the information bits to be included in the HE-SIGB field 242, prior to encoding the information bits. In another embodiment, one or more padding bits are added (e.g., appended), to the information bits to be included in the HE-SIGB field 242 after the information bits are encoded, but before the coded information bits are punctured.

Figure 6:
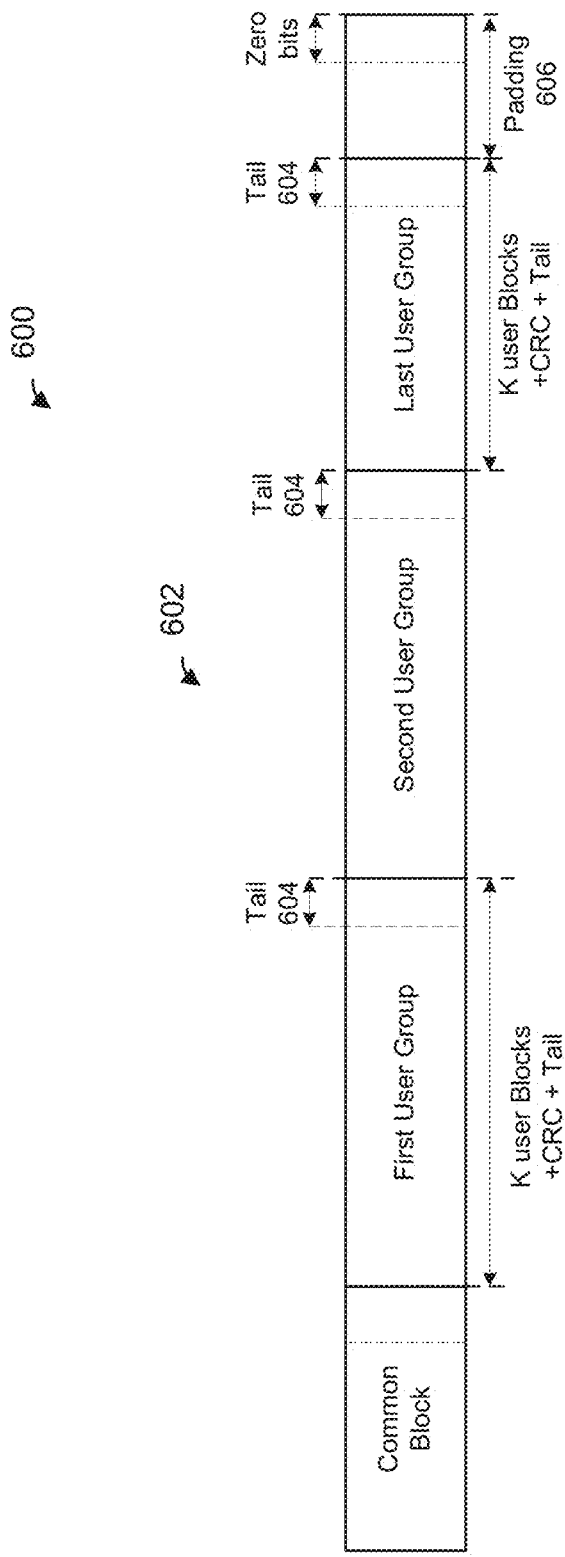
FIG. 6 is a block diagram of a signal field that includes one or more padding bits added to signal field information bits prior to encoding, according an embodiment.

FIG. 6 is a block diagram of a signal field 600 that includes one or more padding bits added to signal field information bits prior to encoding, according an embodiment. In an embodiment, the signal field 600 corresponds to the HE-SIGB field 242. In the embodiment of FIG. 6, user-specific blocks included in the signal field 600 are encoded in groups 602 of user-specific blocks in the manner described with respect to FIG. 5. Prior to encoding the information bits, tail bits 604 (e.g., 6 zero tail bits) are inserted after respective sets of information bits corresponding to each group of user-specific blocks 602, in an embodiment. Also prior to encoding, one or more padding bits 606 are added after tail bits corresponding to the last user-specific block 604. The number of padding bits to be inserted is determined such that the padding bits 606, after being encoded, fill an OFDM symbol up to OFDM symbol boundary, in an embodiment. In an embodiment, the determined number of padding bits also ensures an integer number of puncturing blocks when the signal field 600 is generated according to an MCS that specifies a coding rate that is higher than a base coding rate of a convolutional encoder being used to generate the signal field 600. In an embodiment, the padding bits 606 include pseudorandom padding bits (e.g., padding bits with a pseudo-randomly generated set of values). In another embodiment, the padding bits 606 include repetitions of one or more information bits in the signal field 600. In some embodiments, the last six padding bits 606, or all of the padding bits 606 if the number of padding bits 606 is less than or equal to six, are set to zero to serve as tail bits for resetting a decoder at the receiver.

Figure 7:
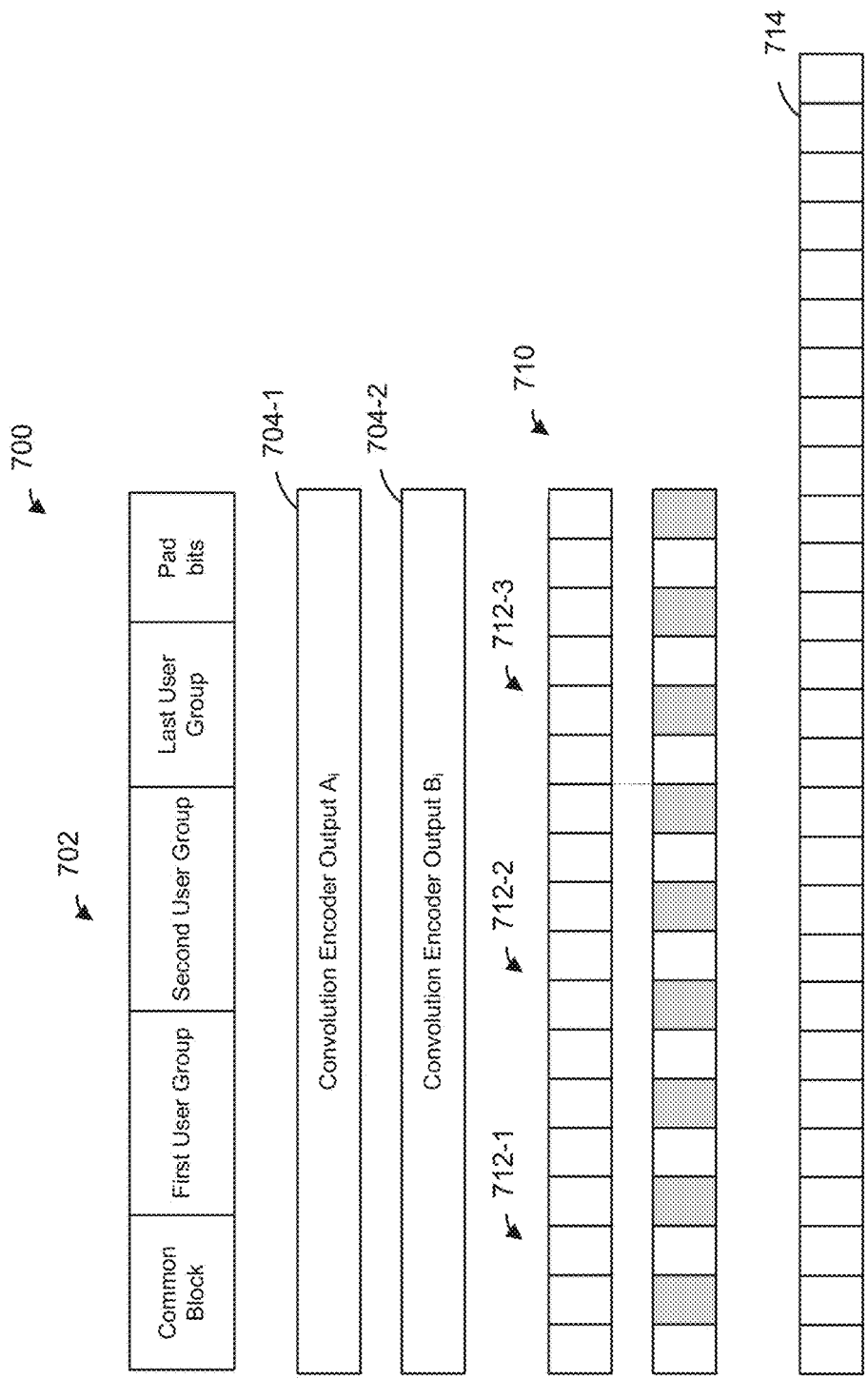
FIG. 7 is a block diagram of an encoding process used for encoding a signal field, according to an embodiment.

FIG. 7 is a block diagram of an encoding process 700 of a signal field 702, according to an embodiment. In an embodiment, the signal field 702 corresponds to the signal field 600 of FIG. 6 and is padded in accordance with the padding scheme described above with respect to FIG. 6. A convolutional encoder (e.g., the encoder 304) encodes padded information bits of the signal field 702 to generate two parallel output bits streams 704, including a first output bit stream A, 704-1 and a second output bit stream B, 704-2. A puncturing engine (e.g., a puncturing engine included in or coupled to the encoder 304) applies a puncturing pattern 710 to the parallel output bit streams 704, and combines punctured bit streams into a single output encoded bit stream. Applying a puncturing pattern to the parallel output bit streams 704 involves puncturing or "stealing" some bits from the first output bit stream 704-1 and/or the second output bit stream 704-2 as defined by the puncturing pattern 710, in an embodiment. The two parallel bit streams are combined, with the punctured bits omitted, resulting in an output encoded bit stream corresponding to a higher coding rate, in an embodiment.

In an embodiment, according to the puncturing pattern 710, the parallel output bit streams 704 are split into puncturing blocks 712, each puncturing block 712 including corresponding bits from each of the output bit streams 704, and one or more bits are punctured or "stolen" from each of the puncturing blocks 712 as defined by the puncturing pattern 710. In the embodiment of FIG. 7, each puncturing block 712 includes six consecutive bits from each of the output bit streams 704, and according to the puncturing pattern 710, three bits are punctured from the six bits of the second output bit stream 704-2 in each of the puncturing blocks 712. In FIG. 7, punctured bits in each of the puncturing blocks 712 are illustrated with grey shading. Accordingly, as illustrated in FIG. 7, if bits in each of the output 704 in each of the blocks 712 are indexed 0 to 5, then bits at indices 1, 3, and 5 are punctured from the output bits stream 704-2 in each of the blocks 712. The remaining, non-punctured, bits in the output bit streams 704 are combined to generate a single output bit stream 714, in an embodiment. Because the punctured bits are omitted from the output bit stream 714, the remaining bits are transmitted at a higher data rate as compared to embodiments and/or scenarios in which puncturing is not performed. For example, in the embodiment of FIG. 7 in which each puncturing block 712 includes twelve bits and puncturing is performed to puncture three of the twelve bits, the resulting output bit stream 714 corresponds to a coding rate of 2/3. In other embodiments, each puncturing block 712 includes a number of bits that is less than or greater than 12 bits and/or a number of bits punctured from each puncturing block is less than or greater than 3 bits. In such embodiments and/or scenarios, the resulting output bit stream 714 corresponds to a coding rate different from (e.g., greater than or less than) the coding rate of 2/3. As just an example, in an embodiment and/or scenario, each puncturing block 712 includes 18 bits, and puncturing is performed to puncture six bits of the 18 bits, resulting in the output bit stream 714 corresponding to a coding rate of 3/4.

Referring again to FIG. 5, in another embodiment, respective sets of one or more padding bits are added (e.g., appended) to information bits corresponding to the BCC block 502 and each of the BCC blocks 504, as needed, in order to insure an integer number of puncturing blocks in the BCC block 502 and in each of the BCC blocks 504. In some embodiments and scenarios, additional one or more padding bits are added (e.g., appended) after information bits corresponding to the last BCC block 504-*y* to ensure that ensure that the total number of padded information bits, after encoding, fill an integer number of OFDM symbols. A convolutional encoder (e.g., the encoder 304) encodes the padded information bits to generate two parallel encoded bit streams as described above with respect to FIG. 6, in an embodiment. A puncturing engine (e.g., a puncturing engine included in or coupled to the encoder 304) separately splits the encoded information bits corresponding to the BCC block 502 and the encoded information bits corresponding to each of the BCC blocks 504 into puncturing blocks, and applies a puncturing pattern to each of the puncturing blocks to achieve a desired coding rate in the manner as described above with respect to FIG. 6, in an embodiment. The punctured bit streams are combined to generate an encoded output bit stream corresponding to the desired rate, in an embodiment.

Figure 8:
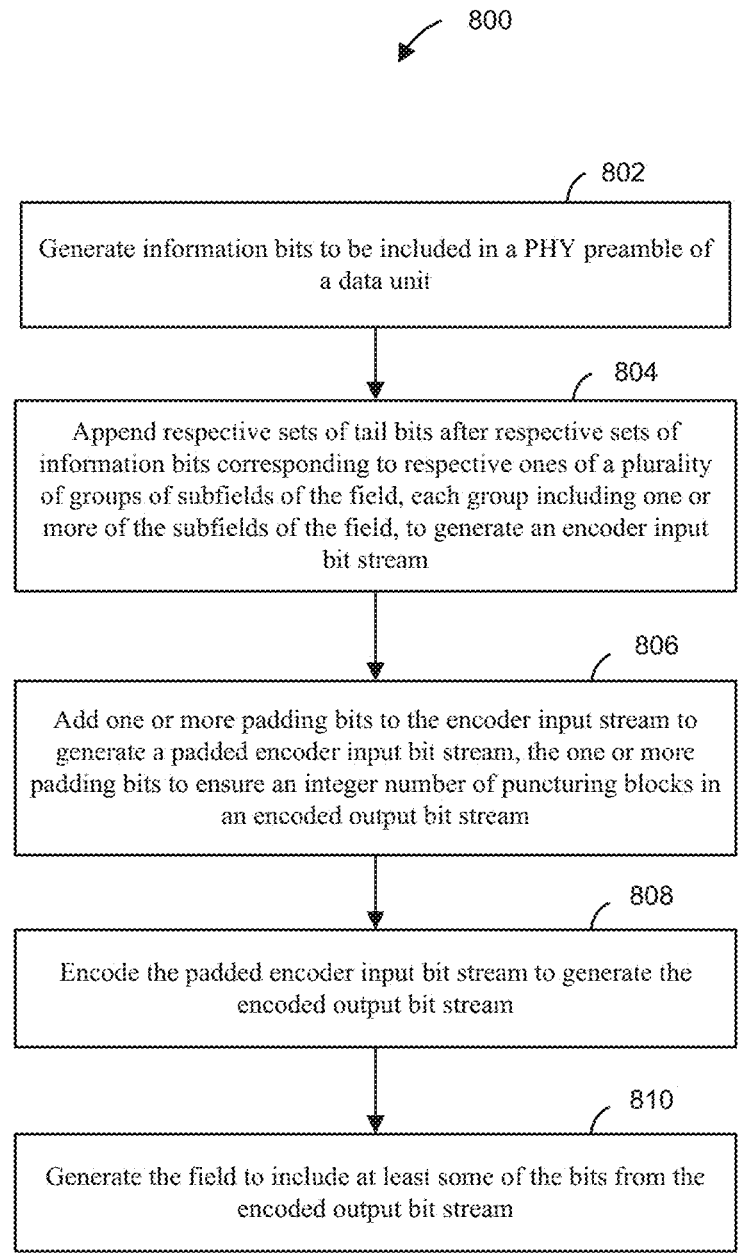
FIG. 8 is a flow diagram of an example method for generating a field of a PHY preamble of a data unit, according to an embodiment.

FIG. 8 is a flow diagram of an example method 800 for generating a field of a PHY preamble of a data unit, according to an embodiment. For example, in an embodiment, the method 700 is for generating a signal field such as a HE-SIGB field. In other embodiments, however, the method 800 may be utilized for generating another suitable PHY preamble field. The method 800 is implemented by the PHY processing unit 20, the PHY processing unit 29, the PHY processing unit 500, and/or the PHY processing unit 600 in various embodiments. Merely for illustrative purposes, the method 800 is described with reference to FIGS. 1 and 3. In other embodiments, however, the method 800 is implemented by another suitable PHY processing unit and/ or network interface device different than those illustrated in FIGS. 1 and 3.

At block 802, bits to be included in the field of the PHY preamble are generated. Block 802 includes generating information bits corresponding to PHY-related information, in an embodiment. In an embodiment in which the field is a signal field the information bits include information needed to decode a data portion of the data unit.

At block 804, respective sets of tail bits are inserted into the information bits to generate an encoder input bit stream. In an embodiment, the respective sets of tail bits are inserted after respective sets of information bits corresponding to respective ones of a plurality of groups of subfields of the field. In an embodiment in which the field is an HE-SIGB field, block 804 includes inserting a first set of tail bits is inserted after a first set of information bit corresponding to a common block field of the HE-SIGB field and respective second sets of tail bits are inserted after respective groups of user-specific fields of the HE-SIGB field.

At block 806, one or more padding bits are added to the encoder input bit stream to generate a padded encoder input bit stream. The one or more padding bits ensure an integer number of puncturing blocks in an encoder output bit stream, in an embodiment. In an embodiment, the one or more padding bits are appended after information bits corresponding to a last group of user-specific fields of the HE-SIGB field. In another embodiment, respective sets of padding bits are appended after information bits corresponding to each group of user-specific fields of the HE-SIGB field. The respective sets of padding bits ensure an integer number of puncturing blocks in encoded bits corresponding to each group of user-specific fields of the HE-SIGB, in an embodiment.

At block 808, the padded encoder input bit stream is encoded to generate the encoder output bit stream. In an embodiment, the encoder output bit stream is an initial encoder output bit stream, and block 808 includes puncturing the initial encoder output bit stream according to a puncturing pattern to generate the encoder output bit stream. Puncturing involves splitting the initial encoder output bit stream into puncturing blocks, and omitting or "stealing" one or more bits from each of the puncturing blocks, in an embodiment. At block 810 the field is generated to include at least some of the bits from the encoded output bit stream.

In an embodiment, a method of generating a field of a physical layer (PHY) preamble of a data unit includes generating, at a communication device, information bits to be included in the field. The method also includes appending, at the communication device, respective sets of tail bits after respective sets of information bits corresponding to respective ones of a plurality of groups of subfields of the field, each group including one or more of the subfields of the field, to generate an encoder input bit stream. The method further includes adding, at the communication device, one or more padding bits to the encoder input stream to generate a padded encoder input bit stream, the one or more padding bits to ensure an integer number of puncturing blocks in an encoded output bit stream. The method additionally includes encoding, at the communication device, the padded encoder input bit stream to generate the encoded output bit stream, and generating, at the communication device, the field to include at least some bits from the encoded output bit stream.

In other embodiments, the method includes any suitable combination of one or more of the following features.

Encoding the padded encoder input bit stream to generate the encoded output bit stream comprises continually encoding the padded encoder input bit stream to generate a plurality of blocks of encoded bits respectively corresponding to the plurality of groups of subfields of the field.

Encoding the padded encoder input bit stream to generate the encoded output bit stream comprises encoding the padded bit stream to generate an initial output bits streams corresponding to a first coding rate.

The method further comprises applying a puncturing pattern to the initial output bit stream to generate the encoded output bit stream to correspond to a second coding rate greater than the first coding rate.

Adding one or more padding bits to the encoder input bit stream to generate the padded encoder input bit stream comprises adding the one or more padding bits after information bits corresponding to a last one of the plurality of groups of subfields of the field.

Adding one or more padding bits to the encoder input stream to generate the padded encoder input bit stream comprises adding respective sets of padding bits after the respective sets of information bits corresponding to the respective ones of the plurality of groups of subfields of the field.

The one or more padding bits ensure an integer number of puncturing blocks in respective sets of encoded information bits corresponding to respective ones of the plurality of groups of subfields of the field.

The field of the PHY preamble of the data unit is a signal field that includes information needed for decoding a data portion of the data unit.

The data unit is a multi-user data unit that includes respective data for multiple intended receivers of the data unit.

The field includes (i) a common block subfield that includes information for all of the multiple intended receivers of the data unit and (ii) one or more user-specific block subfields that respectively include respective information for each of the multiple intended receivers of the data unit.

The plurality of groups of subfields of the field comprises (i) a first group that includes the common block subfield and (ii) one or more second groups that include the one or more user-specific block subfields, wherein at least one of the or more second groups includes multiple ones of the user-specific subfields.

Generating the field comprises generating the field selectively according to at least a first modulation and coding scheme (MCS) corresponding to a first data rate and a second MCS corresponding to a second coding rate.

The method further comprises generating, at the communication device, the data unit to include the PHY preamble and a data portion.

The communication device is a first communication device, and wherein the method further comprises transmitting the data unit from the first communication device to at least one second communication device.

In another embodiment, an apparatus comprises a network interface device having one or more integrated circuits configured to generate information bits to be included in the field. The one or more integrated circuits are also configured to append respective sets of tail bits after respective sets of information bits corresponding to respective ones of a plurality of groups of subfields of the field, each group including one or more of the subfields of the field, to generate an encoder input bit stream. The one or more integrated circuits are further configured to add one or more padding bits to the encoder input stream to generate a padded encoder input bit stream, the one or more padding bits to ensure an integer number of puncturing blocks in an encoded output bit stream. The one or more integrated circuits are additionally configured to encode the padded encoder input bit stream to generate the encoded output bit stream, and generate the field to include at least some bits from the encoded output bit stream.

In other embodiments, the apparatus includes any suitable combination of one or more of the following features.

The one or more integrated circuits are configured to continually encode the padded encoder input bit stream to generate a plurality of blocks of encoded bits respectively corresponding to the plurality of groups of subfields of the field.

The one or more integrated circuits are configured to encode the padded bit stream to generate an initial output bits streams corresponding to a first coding rate, and apply a puncturing pattern to the initial output bit stream to generate the encoded output bit stream such that the encoded output bit stream corresponds to a second coding rate greater than the first coding rate.

The one or more integrated circuits are configured to add the one or more padding bits after information bits corresponding to a last one of the plurality of groups of subfields of the field.

The one or more integrated circuits are configured to add respective sets of padding bits after the respective sets of information bits corresponding to the respective ones of the plurality of groups of subfields of the field.

The one or more padding bits ensure an integer number of puncturing blocks in respective sets of encoded information bits corresponding to respective ones of the plurality of groups of subfields of the field.

The field of the PHY preamble of the data unit is a signal field that includes information needed for decoding a data portion of the data unit.

The data unit is a multi-user data unit that includes respective data for multiple intended receivers of the data unit.

The field includes (i) a common block subfield that includes information for all of multiple intended receivers of the data unit and (ii) one or more user-specific block subfields that respectively include respective information for each of the multiple intended receivers of the data unit.

The plurality of groups of subfields of the field comprises (i) a first group that includes the common block subfield and (ii) one or more second groups that include the one or more user-specific block subfields, wherein at least one of the or more second groups includes multiple ones of the user-specific subfields.

The one or more integrated circuits are configured to generate the field selectively according to at least a first modulation and coding scheme (MCS) corresponding to a first data rate and a second MCS corresponding to a second coding rate.

The one or more integrated circuits are further configured to generate the data unit to include the PHY preamble and a data portion.

The one or more integrated circuits are further configured to transmit the data unit to at least one communication device.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method of generating a field of a physical layer (PHY) preamble of a data unit, the method comprising:
generating, at a communication device, a plurality of information bits to be included in the field of the preamble of the data unit;
appending, at the communication device, respective sets of tail bits after respective sets of information bits of the plurality of information bits such that at least some of the respective sets of tail bits are between at least some of the respective sets of information bits, the respective sets of information bits corresponding to respective ones of a plurality of groups of subfields of the field, each group including one or more of the subfields of the field, to generate an encoder input bit stream to be provided to a particular encoder of the communication device;

continually encoding, with the particular encoder of the communication device, the encoder input bit stream to generate a continually encoded output bit stream, including continually encoding the plurality of groups of subfields of the field having the at least some of the respective sets of tail bits between the at least some of the respective sets of information bits;

puncturing over the continually encoded output bit stream to generate a punctured encoded bit stream;

generating, at the communication device, the field to include at least some bits from the punctured encoded bit stream;

generating, at the communication device, the data unit to include at least the field; and transmitting the data unit from the communication device to at least one intended receiver of the data unit to allow the at least one intended receiver to decode the field.

2. The method of claim 1, wherein continually encoding the encoder input bit stream comprises continually encoding the encoder input bit stream to generate a plurality of blocks of encoded bits respectively corresponding to the plurality of groups of subfields of the field.

3. The method of claim 1, wherein continually encoding the encoder input bit stream comprises continually encoding the bit stream to generate an initial output bit stream corresponding to a first coding rate, and wherein puncturing the encoded bit stream comprises applying a puncturing pattern to the initial output bit stream to generate the continually encoded output bit stream to correspond to a second coding rate greater than the first coding rate.

4. The method of claim 1, further comprising adding one or more padding bits after information bits corresponding to a last one of the plurality of groups of subfields of the field.

5. The method of claim 1, further comprising, prior to continually encoding the input bit stream, adding one or more padding bits to the encoder input bit stream to generate a padded encoder input bit stream, including adding respective sets of padding bits after the respective sets of information bits corresponding to the respective ones of the plurality of groups of subfields of the field, wherein the one or more padding bits ensure an integer number of puncturing blocks in respective sets of encoded information bits corresponding to respective ones of the plurality of groups of subfields of the field.

6. The method of claim 1, wherein the field of the PHY preamble of the data unit is a signal field that includes information needed for decoding a data portion of the data unit.

7. The method of claim 6, wherein
the data unit is a multi-user data unit that includes respective data for multiple intended receivers of the data unit,
the field includes (i) a common block subfield that includes information for all of the multiple intended receivers of the data unit and (ii) one or more user-specific block subfields that respectively include respective information for each of the multiple intended receivers of the data unit, and
the plurality of groups of subfields of the field comprises (i) a first group that includes the common block subfield and (ii) one or more second groups that include the one or more user-specific block subfields, wherein at least one of the or more second groups includes multiple ones of the user-specific subfields.

8. The method of claim 1, wherein generating the field comprises generating the field selectively according to at least a first modulation and coding scheme (MCS) corresponding to a first coding rate and a second MCS corresponding to a second coding rate.

9. The method of claim 8, further comprising generating, at the communication device, the data unit to include the PHY preamble and a data portion.

10. An apparatus, comprising:
a network interface device having one or more integrated circuits configured to
generate a plurality of information bits to be included in a field of a preamble of a data unit;
append respective sets of tail bits after respective sets of information bits of the plurality of information bits such that at least some of the respective sets of tail bits are between at least some of the respective sets of information bits, the respective sets of information bits corresponding to respective ones of a plurality of groups of subfields of the field, each group including one or more of the subfields of the field, to generate an encoder input bit stream to be provided to a particular encoder;
continually encode, with the particular encoder, the encoder input bit stream to generate the encoded output bit stream, including continually encoding the plurality of groups of subfields of the field having the at least some of the respective sets of tail bits between the at least some of the respective sets of information bits;
puncture over the continually encoded output bit stream to generate a punctured encoded bit stream;
generate the field to include at least some bits from the punctured encoded bit stream;
generate the data unit to include at least the field; and
transmit the data unit from the communication device to at least one intended receiver of the data unit to allow the at least one intended receiver to decode the field.

11. The apparatus of claim 10, wherein the one or more integrated circuits are configured to continually encode the encoder input bit stream to generate a plurality of blocks of encoded bits respectively corresponding to the plurality of groups of subfields of the field.

12. The apparatus of claim 10, wherein the one or more integrated circuits are configured to
encode the encoder input bit stream to generate an initial output bit stream corresponding to a first coding rate, and
apply a puncturing pattern to the initial output bit stream to generate the continually encoded output bit stream such that the encoded output bit stream corresponds to a second coding rate greater than the first coding rate.

13. The apparatus of claim 10, wherein the one or more integrated circuits are further configured to, prior to encoding the encoder input bit stream, add one or more padding bits after information bits corresponding to a last one of the plurality of groups of subfields of the field.

14. The apparatus of claim 10, wherein the one or more integrated circuits are further configured to add respective sets of padding bits after the respective sets of information bits corresponding to the respective ones of the plurality of groups of subfields of the field, wherein the one or more padding bits ensure an integer number of puncturing blocks in respective sets of encoded information bits corresponding to respective ones of the plurality of groups of subfields of the field.

15. The apparatus of claim 10, wherein the field of the PHY preamble of the data unit is a signal field that includes information needed for decoding a data portion of the data unit.

16. The apparatus of claim 10, wherein
the data unit is a multi-user data unit that includes respective data for multiple intended receivers of the data unit,
the field includes (i) a common block subfield that includes information for all of multiple intended receivers of the data unit and (ii) one or more user-specific block subfields that respectively include respective information for each of the multiple intended receivers of the data unit, and
the plurality of groups of subfields of the field comprises (i) a first group that includes the common block subfield and (ii) one or more second groups that include the one or more user-specific block subfields, wherein at least one of the or more second groups includes multiple ones of the user-specific subfields.

17. The apparatus of claim 10, wherein the one or more integrated circuits are configured to generate the field selectively according to at least a first modulation and coding scheme (MCS) corresponding to a first coding rate and a second MCS corresponding to a second coding rate.

18. The apparatus of claim 10, wherein the one or more integrated circuits are further configured to generate the data unit to include the PHY preamble and a data portion.

* * * * *